United States Patent [19]
Balke et al.

[11] Patent Number: 5,546,789
[45] Date of Patent: Aug. 20, 1996

[54] LEAKAGE DETECTION SYSTEM

[75] Inventors: David J. Balke; Jacques E. Hoffmann, both of Chicago, Ill.

[73] Assignee: InterTech Development Company, Skokie, Ill.

[21] Appl. No.: 237,316

[22] Filed: May 3, 1994

Related U.S. Application Data

[63] Continuation of Ser. No. 924,312, Aug. 3, 1992, abandoned.

[51] Int. Cl.⁶ .............................. G01M 3/26; G01M 3/32
[52] U.S. Cl. ................................................. 73/40; 73/49.2
[58] Field of Search ............................. 73/40, 49.2, 49.3, 73/52

[56] References Cited

U.S. PATENT DOCUMENTS

| | | | |
|---|---|---|---|
| 2,872,806 | 2/1959 | Mamzic | 73/40 |
| 3,028,750 | 4/1962 | Rondeau | 73/49.2 |
| 3,331,237 | 7/1967 | Strang | 73/40 |
| 3,360,981 | 1/1968 | Badger | 73/40 |
| 3,691,821 | 9/1972 | Davey | 73/49.2 |
| 3,872,712 | 3/1975 | Westervelt et al. | 73/40 |
| 3,893,332 | 7/1975 | Dolan et al. | 73/40 |
| 4,055,984 | 11/1977 | Marx | 73/40 |
| 4,523,452 | 6/1985 | Brayman | 73/40 |
| 4,587,619 | 5/1986 | Converse, III et al. | 364/552 |
| 4,593,554 | 6/1986 | Aarts | 73/49.3 |
| 4,670,847 | 6/1987 | Furuse | 364/507 |
| 4,675,834 | 6/1987 | Furuse | 364/558 |
| 4,776,206 | 10/1988 | Armstrong et al. | 73/40 |
| 4,794,784 | 1/1989 | Bley | 73/1 G |
| 4,811,252 | 3/1989 | Furuse | 364/556 |
| 4,905,501 | 3/1990 | Sawatani | 73/40 |
| 4,928,528 | 5/1990 | Marques | 73/40 |
| 4,993,256 | 2/1991 | Fukuda | 73/49.2 |
| 5,029,464 | 7/1991 | Lehmann | 73/49.3 |
| 5,065,350 | 11/1991 | Fedder | 364/507 |
| 5,349,846 | 9/1994 | Martinez et al. | 73/40 |
| 5,412,978 | 5/1995 | Boone et al. | 73/40 |

OTHER PUBLICATIONS

Intech Industry, Article: "Mass Flow Sensing Improves Leak Detection", Jacques E. Hoffmann, Jul., 1991, ISA Reprint.

*Primary Examiner*—Hezron E. Williams
*Assistant Examiner*—Helen C. Kwok
*Attorney, Agent, or Firm*—Fitch, Even, Tabin & Flannery

[57] ABSTRACT

A leakage detection system and method for measuring pressure leaks from pressure vessels, containers, or the like which hold or exclude fluids. A sealed test fixture or bell jar surrounds the container or part under test and is connected to a reference pressurized reservoir. A reference bias flow is introduced into the bell jar to establish a "floor" or offset wherein any deviation measured from introduced bias flow indicates an anomaly. The test part is pressurized. The flow between the bell jar and the reference pressurized reservoir is measured by a mass flow leak sensor. The measured flow is used to determine the leakage of the test part by taking into account the previously introduced reference bias flow. The present invention provides accurate measurement of leaks having low flow rates occurring over short periods of time.

19 Claims, 3 Drawing Sheets

LEAKAGE DETECTION SYSTEM

This application is a continuation of application Ser. No. 07/924,312 filed Aug. 3, 1992 now abandoned.

FIELD OF THE INVENTION

The present invention relates to a leakage detection system and method for measuring pressure leaks from pressure vessels, containers, or the like which hold or exclude gases. In particular, the leakage detection system accurately detects leaks exhibiting low flow rates.

BACKGROUND OF THE INVENTION

Leak detection equipment is used in a variety of industries to determine whether products are properly manufactured and assembled. Leak detection equipment is used to test individual products for the presence of leaks which would degrade the performance of the product during the products useful life. Not all leaks are, however, fatal to the performance of a product and a maximum acceptable leak is often established for a product.

The object of leak testing is to measure the rate of leakage and to determine whether the measured leak is less than the maximum acceptable leak. Any product leaking at a rate less than the maximum acceptable leak meets the performance specifications relating to the part under test.

A leak is defined as the escape or entry of a gas or liquid into a sealed enclosure. Leaks result from material defects (holes or porosity) or process deficiencies such as sealing or joining problems. The majority of leaks are not simple circular holes in thin walls which exhibit predictable performance but more often are comprised of multiple variable paths that tend to be unique to a particular test part subjected to a specific set of conditions. Leaks of these types can have low leakage rates making them difficult to measure.

The detection of a leak from a test part under pressure is difficult to measure if the anticipated rate of leakage from the part is low or the available time for the measurement is relatively short. High levels of pressurization can induce significant adiabatic heating effects which must be dissipated before an accurate measurement can be taken. The magnitude of this problem is a direct function of the mass of the pressurizing gas; thus, the volume enclosed by the test part and the pressure of the gas contained within the test part affect the magnitude and severity of the adiabatic heating effects.

Bubble testing is the most prevalent method of leak testing in industry. It consists of pressurizing the part to be tested, submersing the part in a water bath, and looking for a stream of bubbles. Although leaks as small as 0.05 standard cubic centimeters per minute (sccm) can be detected, this method has major disadvantages. It is slow, demands continuous operator attention, and usually requires drying the tested part before the part can continue in the manufacturing process. Determination of the amount of leakage flow is a difficult task.

Helium mass spectrometer leak detection is the most common method used to detect very small leaks as low as $10^{-11}$ standard cubic centimeters per second (sccs). The part under test is either pressurized internally or externally with helium or a mixture of helium and air. The helium leakage is drawn into a very low vacuum and introduced into a mass spectrometer which has been tuned to helium. The mass spectrometer output is proportional to the number of helium ions, which is a direct measure of leakage. Helium leak detection equipment is expensive and can require long test times.

Another method of leak detection is the pressure decay method. In the pressure decay method, the part to be tested is pressurized to a pressure determined by a supply pressure. Once pressurized, the part under test is sealed to maintain the pressure therein. A pressure sensor is attached to the part which measures the internal pressure of the part under test. If a leak is present, the pressure of the part will begin to decay at a rate determined by the size of the leak and the volume of the part. A test operator can determine the relative size of the leak by reading the pressure at the end of the test time and comparing it to a predetermined limit value.

The pressure sensor used in the pressure decay method is typically a gauge pressure sensor having a reference to atmospheric pressure. When the gauge pressure sensor is used at normal test pressures, the pressure change resulting from a leak test is a very small portion of the total range on the sensor, since the gauge pressure sensor measures pressure differential between the part pressure and atmosphere. Consequently, the signal from the sensor is small. In order to obtain a usable reading with this system, it is often necessary to extend the test time, particularly if large parts or small leaks are involved. In some cases, this results in unacceptably long test times.

Another method uses a mass flow leak sensor rather than a gauge pressure sensor. In precision mass flow leak testing, the mass flow leak sensor connects the test part to a non-leaking reference volume usually having substantially the same volume as the test part. Then the reference volume and the test part are pressurized to the same level. Both the reference volume and the test part are sealed off from the pressure supply. If a leak is present in the test part, the mass flow leak sensor measures flow inherent in the equalization of pressure between the test part and the reference volume. The difference in pressure causes gas to flow from the reference volume to the test item at a rate proportional to the leak.

An alternative method of leak detection measurement using a differential pressure sensor encloses the test part in a sealed bell jar. Leakage from the test part increases the internal pressure in the internal space within the bell jar and exterior to the test part. The increase in pressure relative to a reference pressure is measured by a transducer and converted to an equivalent leakage rate.

This method is less sensitive to the effects of high test pressures and is not sufficiently accurate to detect low leakage rates particularly where short test times are a requirement since the internal free volume of the bell jar can be large. Because the differential pressure rate involves the measurement of pressure at two different times and the interval between these times is a function of the transducer sensitivity, this method is often not adequate in critical applications. Leak measurements cannot be made until sufficient time has elapsed to develop a differential pressure.

SUMMARY OF THE INVENTION

The present invention is a leakage detection system particularly suited for detecting low flow rates over short periods of time and for more accurately measuring all types of flow rates over all periods of time. A sealed test fixture or bell jar surrounds the part to be tested. A reference leak pressure regulator generates a reference flow or reference bias flow to detect for any improper functioning of the leak detection system before and during testing. The reference bias flow establishes a "floor" or an offset. Any deviation from the "floor" or offset prior to testing indicates the presence of an anomaly within the system. For instance, if the measured leakage prior to pressurization of the test part is less than the "floor", then a flow through the bell jar seal (seal leakage) may exist or the bias flow may have been incorrectly set, which is a fault condition. Advantageously, the bell jar is a conformable bell jar which conforms to the outer dimension of the test part to improve sensitivity and accuracy of testing.

In calibrating the leak detection system, the reference bias flow is assumed to represent zero test part leakage as long as it is greater than a minimum bias flow limit and less than a maximum bias flow limit. Additionally, a reference pressurized reservoir is connected through a mass flow transducer to the sealed test fixture for sensing flow between the referenced pressurized reservoir and the bell jar.

The reference bias flow is sensed prior to pressurization of the test part by the mass flow transducer. The part under test is then pressurized internally by a pressure regulator. The amount of gas flow passing between the pressurized reservoir and the sealed test fixture is detected by the mass flow transducer and indicates the amount of the pressure leak from the test part into the sealed test fixture. The detected flow is the algebraic sum of any seal leakage, if present, test part leakage and the bias flow.

The injection of the reference bias flow produces more accurate testing of test parts than previously available with conventional leak testing apparatus. For example, leaks from the sealed test fixture or bell jar can often be a significant proportion of the leakage from a test part. By measuring the flow between the bell jar and the reservoir after injection of the reference flow and before testing, any leaks to the bell jar become known quantities. If the flow between the bell jar and reservoir is too small, the seal to the bell jar is checked and resealed. If, however, the flow between the bell jar and the reservoir is within acceptable limits, testing of the test part can proceed.

Normally, the test part is pressurized and the bell jar is maintained at atmospheric pressure. It is also within the scope of the present invention to evacuate the test part to a vacuum or negative pressure and seal the bell jar at atmosphere.

To begin testing, the test part is pressurized internally by a pressure source. Once pressurization of the test part is completed, any leakage from the part under test is into the bell jar. Through adjustment of the reference flow and measurement of flow between the reservoir and the bell jar prior to testing, the measured value of leakage from the test part after pressurization is accurately determined. By observing for leaks from the bell jar prior to testing and other problems, the present invention accurately and quickly measures leak rates of test parts.

DETAILED DESCRIPTION OF THE PREFERRED EMBODIMENT

Figure 1:
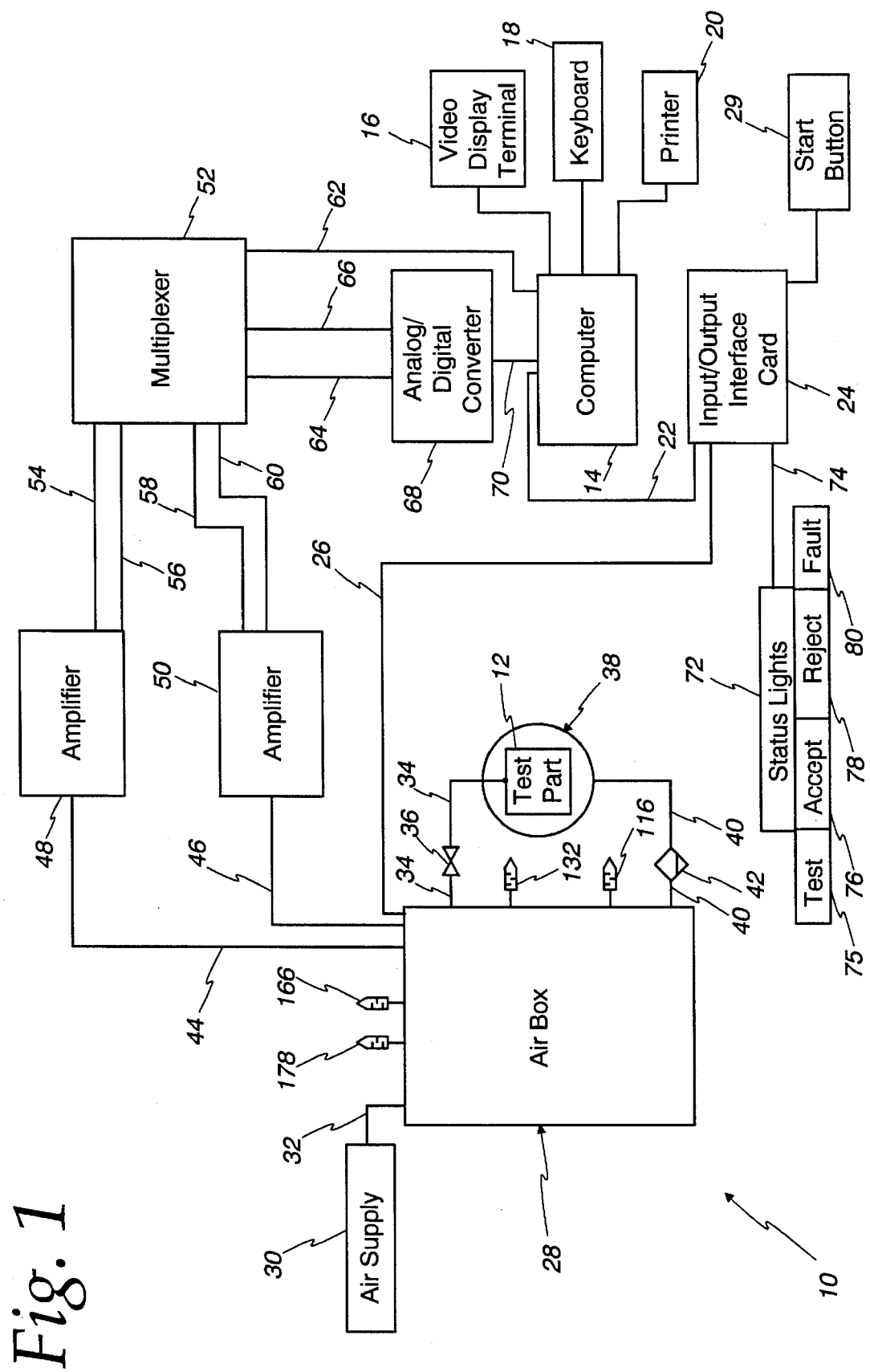
FIG. 1 illustrates a leakage detection system of the present invention.

FIG. 1 illustrates a leak detection system 10 of the present invention for detecting a leak from a container under pressure or test part 12. The leak detection system 10 is controlled by a computer 14. The computer 14 is connected to a video display terminal 16, a keyboard 18 and a printer 20. The video display terminal 16, the keyboard 18, and the printer 20 are used as input and output devices as is understood in the art. In the present embodiment, the computer 14 is an International Business Machines (IBM) PS/2. Other computers may also be used as will become apparent to those skilled in the art.

The computer 14 is connected though a cable 22 to an input/output interface card 24. The cable 22 connects the IBM PS/2 computer to the input/output interface card 24. The input/output interface card 24 consists of a series of connections for coupling the conductors at slot one of the IBM PS/2 to the output interface card 24 and to a cable 26. In addition, a start button 29 is connected to the input/output interface card 24. The cable 22 carries signals generated by the computer 14 for controlling an air box 28 as well as for indicating the operation of the air box. The present embodiment of the invention controls up to four air boxes at a time, however, for illustrative purposes control of only one air box is discussed herein as a single air box illustrates the invention. In addition, for the present discussion, internal pressurization of a test part will be discussed. However, external pressurization is also within the scope of the invention as will become apparent to those skilled in the art.

The air box 28 delivers pressurized air or gas to the test part 12 under controlled conditions. The air box 28 receives a supply of air from an air supply 30 through an air line 32. The air box 28 releases the pressurized air to the test part 12 through an air line 34. The air line 34 connects the test part 12 to the air box 28. A manual shut-off valve 36 is placed in the air line 34 to provide manual shut-off of air to the test part 12 if desired. The test part 12 is located beneath a bell jar or sealed test fixture 38 which completely encloses the test part 12 and substantially seals the test part 12 from the effects of atmospheric pressure outside the sealed test fixture 38. The bell jar of the embodiment is a conformable bell jar which conforms to the outer dimensions of the test part to improve accuracy and sensitivity. By reducing the amount of volume to be filled, short test times are achieved. The sealed test fixture 38 is connected to the air box 28 through an air line 40. The air line 40 is connected to means for connecting the air line 40 to the sealed test fixture 38, thereby connecting the interior of the bell jar to the air line 40. The air line 40 optionally includes a separator or dryer 42 for conditioning the air flowing from the sealed test fixture 38.

The sealed test fixture 38 is a sealed enclosure such as a bell jar which entirely encloses the test part 12. The sealed test fixture includes means for connecting the test part to the air line 34. Before testing of the test part 12 begins, the sealed test enclosure 38 is sealed at atmospheric pressure. A measured amount of air flow or a reference bias flow is injected through the air line 40. The reference bias flow is measured and its value indicates whether or not a part can be successfully tested. Once the reference bias flow is measured and corrective action taken if necessary, the test part 12 is pressurized.

In operation, the air box 28 pressurizes the test part to a predetermined level. Pressurization can be either a positive pressure or negative pressure. Any air leaking from the test part 12 exits into the sealed test fixture 38 and consequently changes the pressure therein. This change in pressure is sensed by the air box 28. The pressure supplied to the test part 12 is monitored by the air box 28 and an analog pressure signal indicating the amount of pressure supplied thereto is produced on a first output conductor 44. In addition, the amount of leakage from the test part 12 into the sealed test fixture 38 is sensed by the air box 28 and an analog leakage signal used to determine the amount of leakage is produced on a second output conductor 46.

The first output conductor 44 is connected to a pressure signal amplifier 48. In the present embodiment, the pressure signal on the first output conductor 44 has a range of plus or minus 0.025 volts. The pressure signal amplifier 48 amplifies the pressure signal to signal having a range of plus or minus 10 volts.

The second output conductor 46 is connected to a leakage signal amplifier 50. In the present embodiment, the leakage signal on the second output conductor 46 has a range of plus or minus 0.0025 volts. The leakage signal amplifier 50 amplifies the leakage signal to a signal having a range of plus or minus 10 volts. These amplifiers are standard signal amplifiers as is understood by those skilled in the art.

The pressure signal amplifier 48 is coupled to a multiplexer 52 through a conductor 54 and a conductor 56. The leakage signal amplifier 50 is coupled through a conductor 58 and a conductor 60 to the multiplexer 52. The multiplexer 52 is connected to the computer 14 through a control conductor 62. The control conductor 62 carries control signals from the computer 14 to the multiplexer 52 for selecting a signal from either the pressure signal amplifier 48 or the leakage signal amplifier 50. The multiplexer 52 selects either the pressure signal on the conductors 54 and 56 or the leakage signal on the conductors 58 and 60 and outputs the selected signal on output conductors 64 and 66. In the present embodiment, the multiplexer 52 updates the pressure signal fifty times per second. Of course, other rates of updating the pressure and leakage signals are possible. The signal carried on the output conductors 64 and 66 has a range of plus to minus 5 volts.

The output conductors 64 and 66 are coupled to an analog to digital converter 68. The analog to digital converter 68 converts the analog signal on the output conductors 64 and 66 to a digital signal which appears on a converter output conductor 70. The analog to digital converter 68 in the present embodiment converts the plus to minus five volt signal on the output conductors 64 and 66 to a digital signal of from 0 to 4096 counts or bits. Consequently, to carry a digital signal of from 0 to 4096 bits, the converter output conductor 70 includes at least twelve conductors. The convertor output conductor 70 is connected to the computer 14. Other signal accuracies are also possible.

FIG. 1 also illustrates a plurality of status lights 72 coupled to the input/output interface card 24 through multiple conductors 74. The output status lights 72 indicate various conditions and results that can occur during and after a test of the test part 12. The status lights 72 include a test light 75, an accept light 76, a reject light 78, and a fault light 80. Other lights can be included depending on the requirements of the system. The status lights are lit before, during, and after testing the test part 12 as described herein.

Figure 2:
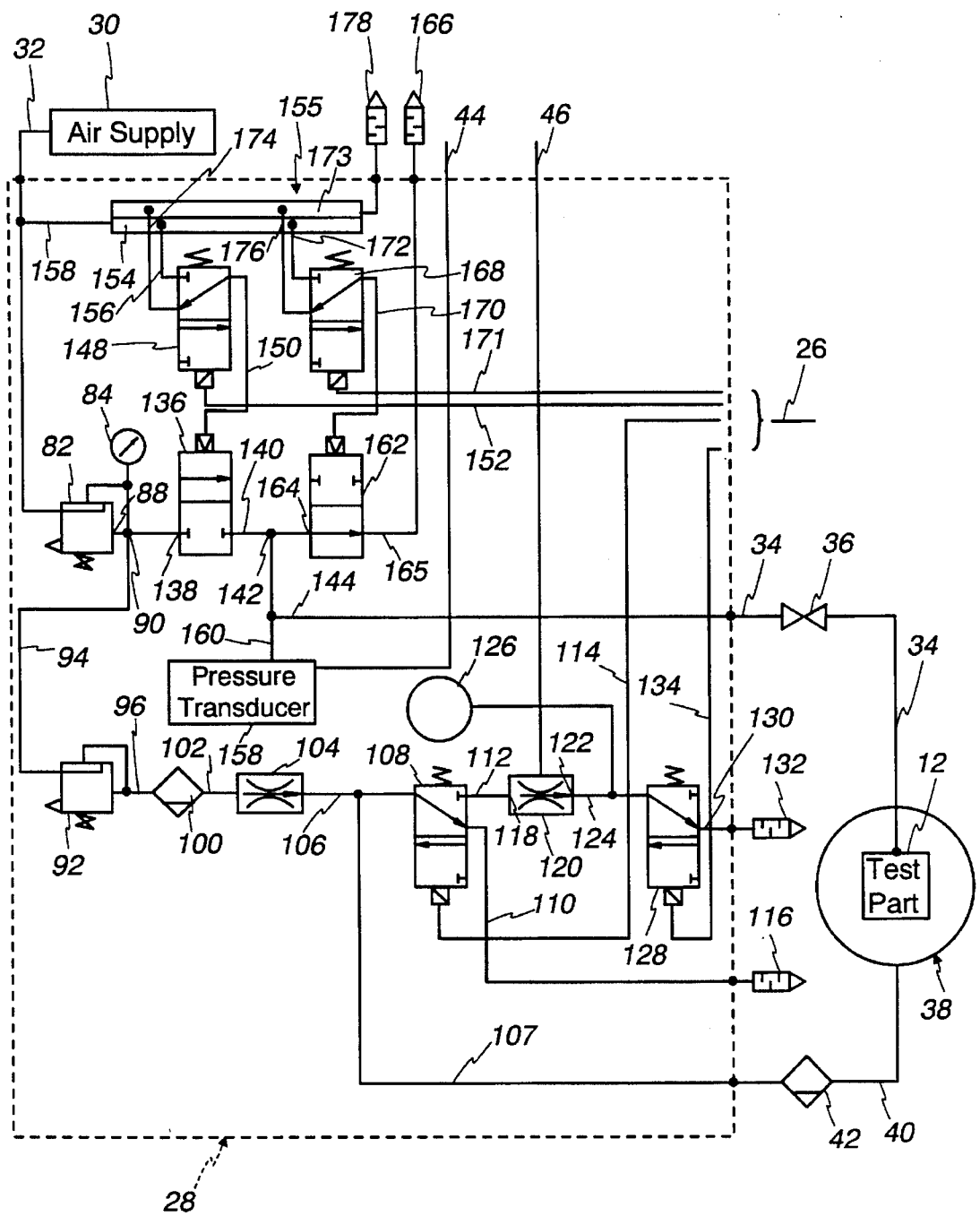
FIG. 2 is a diagrammatic representation of an air box of the present invention connected to a part under test.

FIG. 2 illustrates the air box 28 of the present invention. As previously described, the air box 28 is connected to the air supply 30 which pressurizes the test part 12 and introduces a constant reference bias flow into the sealed test fixture to detect for proper operation. The air supply 30 is connected through the line 32 to a pressure regulator 82 having a meter 84 for indicating pressure. The pressure regulator 82 has an output line 88 for delivering regulated pressurized air to a junction 90. The junction 90 is connected to a bias flow pressure regulator 92 through an air line 94. The bias flow pressure regulator 92 adjusts the pressure of air at an output line 96. The output line 96 is connected to a separator or dryer 100 for removing moisture from the forced air. The dryer 100 is connected through an air line 102 to a flow orifice 104.

The flow orifice 104 restricts or establishes the flow of air to 1 cubic centimeter/minute (cc/m) at 30 pounds per square inch (psi) in combination with the pressure regulator 92. The flow orifice 104 is not, however, limited to this amount of flow and other flow orifices having different fixed flows are also acceptable. In addition, adjustable flow orifices can be used. These orifices have adjustment means for adjusting the size of the orifice, thereby adjusting the rate of flow passing through the flow orifice. The flow orifice 104 provides known constant flow which enables accurate calibration and operation of the system.

The reference bias flow is injected into a transducer sensing line 106. The injected reference flow is used to detect problems in the system, for example, to determine if the sealed test fixture 38 is adequately sealed. The injected reference flow is sent to the sealed test fixture 38 through the transducer line 106 which is coupled through a line 107 to the air line 40 which is in turn connected to the sealed test fixture 38. The transducer sensing line 106 is also connected to a normally open, two-position three way valve or test solenoid valve 108.

The test solenoid valve 108 has a first output 110 and a second output 112. In addition, a control conductor 114 is coupled to the valve 108 for controlling the test solenoid valve 108. The control conductor 114 is connected to the cable 26. The first output 110 is connected to a vent 116 for venting the sealed test fixture 38 to atmosphere. The second output 112 is connected to an input 118 of a mass flow transducer or leak sensor 120. The mass flow transducer 120 used in the present invention is described in pending U.S. patent application Ser. No. 07/661,685 filed Feb. 27, 1991 entitled "Mass Flow Sensor For Very Low Fluid Flows" and is incorporated herein by reference. Other standard mass flow sensors, however, may also be used. Since only a single measurement is necessary, test times can be shortened and more accurate measurements made. Gas flow transducers can also be used.

The mass flow transducer 120 measures the amount of flow passing through the transducer 120 and generates a signal representing the amount of flow on the second output conductor 46 of the air box 28. The output 122 of the mass flow transducer 120 is connected to an air line 124. The air line 124 is connected to a reservoir 126. The reservoir 126 has an interior volume approximately equal to the interior volume of the test part 12. Other reservoirs with different volumes can also be used. For instance, the volume of the reservoir can also be several times the volume of the test part 12. Since the volume of the reservoir is known, the comparative volumes are taken into account to achieve accurate test results. The air line 124 is connected to means for connecting the air line 124 to the reservoir 126 to connect the interior thereof to the air line 124. The air line 124 is also connected to a normally open, two-position three way valve or vent solenoid valve 128. An output 130 of the vent solenoid valve 128 is connected to a vent 132. The vent solenoid valve 128 is controlled through a control conductor 134 connected to the cable 26.

Before a part is tested, the test part is isolated from the supply of pressurizing air and vented to atmosphere. Then, the sealed test fixture 38 is sealed, valve 108 is energized to disconnect line 106 from the vent 116, and a constant reference bias flow is produced by the bias flow pressure regulator 92 into the transducer sensing line 106. At low rates of leakage, minute leakage through the sealed test fixture 38 can be a significant proportion of the total leakage to be measured from the test part 12. Consequently, when testing for low rates of leakage from a test part, the use of the reference bias flow to check for problems including improper sealing of the sealed test fixture 38 is desirable.

The amount of reference bias flow produced by the bias flow pressure regulator 92 is based on the acceptable limit leakage of the test part typically determined through empirical analysis. For instance, the maximum acceptable leakage for a passenger car tire valve can result in a pressure loss of no more than a pound a month. The reference bias flow is calculated to be a small proportion of the maximum acceptable leakage which, in this case, is approximately 50% or 0.5 cc/min of the maximum acceptable leakage for the passenger car tire valves. The reference bias flow remains the same when testing the same types of parts.

Other types of test parts may require reference bias flows having different percentages of the maximum acceptable leakage for the given type of part. The amount of reference bias flow is based upon tested parts found to be near the borderline of acceptability. In addition, the amount of reference bias flow depends on the practicability of generating the reference bias flow itself and the ability of the leak detector system to differentiate between the amount of reference bias flow and the amount of leakage being detected. The reference bias flow is typically evaluated prior to pressurizing the test part, although in less critical applications the evaluation can be made after part pressurization.

The mass flow transducer 120 measures the amount of flow passing through the line 112 to the line 124. The test solenoid valve 108 is positioned so that air flow passes through the mass flow transducer 120 instead of the vent 116. The vent solenoid valve 128 is disconnected from the vent 132. The reservoir 126 is thus coupled to the line 106 via line 112 and line 124 and subsequently to the sealed test fixture 38 which is coupled via line 40 and line 107 as shown in FIG. 2. Any pressure differential between the sealed test fixture 38 and the reservoir 126 tends to equalize. The flow required to equalize pressure is measured by the mass flow transducer 120. The combination of the mass flow transducer 120 and the conformable bell jar provides for increased accuracy and shortened test times. For instance, the maximum total test time for the tire valve previously mentioned is 0.8 seconds.

Testing begins upon activation of the start button 29. The test light 75 is lit and the reference bias flow begins. Valve 108 connects line 112 to line 106. If a leak exists in the seal to the sealed test fixture 38, the reference bias flow has two paths to follow; 1) through the mass flow transducer 120 to the reservoir 126, and 2) through the line 40 to the sealed test fixture 38. The amount of flow measured by the mass flow transducer 120 is equal to the reference bias flow minus any leakage through the seal of the sealed test fixture 38. If the flow measured by the mass flow transducer 120 is less than the generated reference bias flow, a leak is present in the seal to the bell jar. If the leak is too great, the test is aborted, lighting the fault light 80 and the reject light 78. The seal to the bell jar is then adjusted to stop the leak or adjusted sufficiently to reduce the leak to an acceptable level. Otherwise, the leak is measured and its value used later to determine leak rate, if any, from the test part. Some seal leaks are small enough that testing of the part is not affected and the test can continue by taking the seal leak into account when making measurements.

The mass flow transducer 120 also determines if the bias flow has been incorrectly set by the pressure regulator 92 and the flow orifice 104. For instance, if the bias flow is set too high for a part being tested and there is no leak in the bell jar, the mass flow transducer 120 will measure flow which exceeds the predetermined bias flow for the part being tested. If the bias flow is too great, the system is turned off and the bias flow is adjusted to the proper value for the part being tested.

The mass flow transducer 120 could alternatively be located in the line 107 between the line 106 and the line 40. The preferred location is, however, as illustrated.

Once leakage from the sealed test fixture 38 has been detected and corrected if necessary, the test part 12 is pressurized. To pressurize the test part, the manual shut-off valve 36 is positioned in the open position. The manual shut-off valve 36 is typically used only for setup and troubleshooting. A normally closed two position two-way fill valve 136 or pilot-operated valve 136 has an input 138 connected to the junction 90 and an output 140 for pressurizing the test part 12. The output 140 is connected to a junction 142 which is connected to the test part by a air line 144. The air line 144 directs pressurized air to the test part through connection to the air line 34.

The normally closed fill valve 136 is controlled by a solenoid-operated pilot valve 148. The solenoid valve 148 controls the operation of the fill valve 136 through the mechanical control of a spool under the force of pressurized fluid represented here by a control line 150 as is understood by one skilled in the art. It will be appreciated that a direct operating solenoid valve can replace the two valves 136 and 148, but the present arrangement avoids self-heating caused by solenoids which can affect the leak measurement.

A control conductor 152 carries a signal from the computer 14 to open or close the fill valve 136 through control of the solenoid valve 148. The solenoid-operated pilot valve 148 is connected to a first passage 154 of a two-passage manifold 155 through a line 156. The first passage 154 is connected to the air supply 30 by a line 158. When the solenoid is activated by a signal received on the conductor 152, pressurized air flows from the air supply 30 to the solenoid-operated pilot valve 148. This in turn causes the normally closed fill valve 136 to open by the control line 150.

Once the valve 136 is open, the valve 162 is closed to prevent venting to atmosphere, and the pressure supplied to the test part 12 is monitored by a pressure transducer 158. The pressure transducer 158 is connected to the junction 142 through a line 160 and senses the pressure supplied to the test part 12 to develop a pressure signal. The conductor 44 carries a signal indicating the level of pressure to computer 14.

After the test part 12 is pressurized, the fill valve 136 closes, isolating the test part from the pressure source. Any leaks present in the test part will leak into the sealed test fixture 38 and cause a change in the equalized pressure between the sealed test fixture 38 and the reservoir 126 to which it is connected. The change in pressure creates a flow of gas through the mass flow transducer 120 where the flow is measured. The measure of flow is sent to the computer 14 over the conductor 46. The computer analyzes the flow measurement and determines whether the test part 12 meets the test limits. Test limits are established according to the characteristics of the part being tested and include taking into account adiabatic and other effects known to those skilled in the art. If the test part 12 meets test limits, the computer causes the accept light 76 of the status lights 72 to be energized. Otherwise, if the test part 12 does not meet the test requirements, the reject light 78 is lit by the computer 14.

Once testing is completed, any residual pressure is vented to atmosphere. A normally open, two-position two way vent valve 162 has an input 164 connected to the junction 142 for venting the pressure from the test part 12 through an output 165. The output 165 is connected to a vent 166. The vent valve 162 is controlled by a solenoid-operated pilot valve 168. The solenoid valve 168 is pneumatically coupled to the valve 162 represented by a control line 170, as previously described. A control conductor 171 is connected to the solenoid valve 168 for controlling the operation of the solenoid valve 168 and the vent valve 162. The control conductor 171 is connected to the cable 26. The solenoid valve 168 is also connected to the air supply 30 through a line 172 connected to the first passage 154 of the two-passage manifold 155.

Finally, both the solenoid valve 148 and the solenoid valve 168 are connected to a second passage 173 of the manifold 155 through an air line 174 and an air line 176, respectively. The second passage 173 is connected to a vent 178 for venting to atmosphere.

Figure 3:
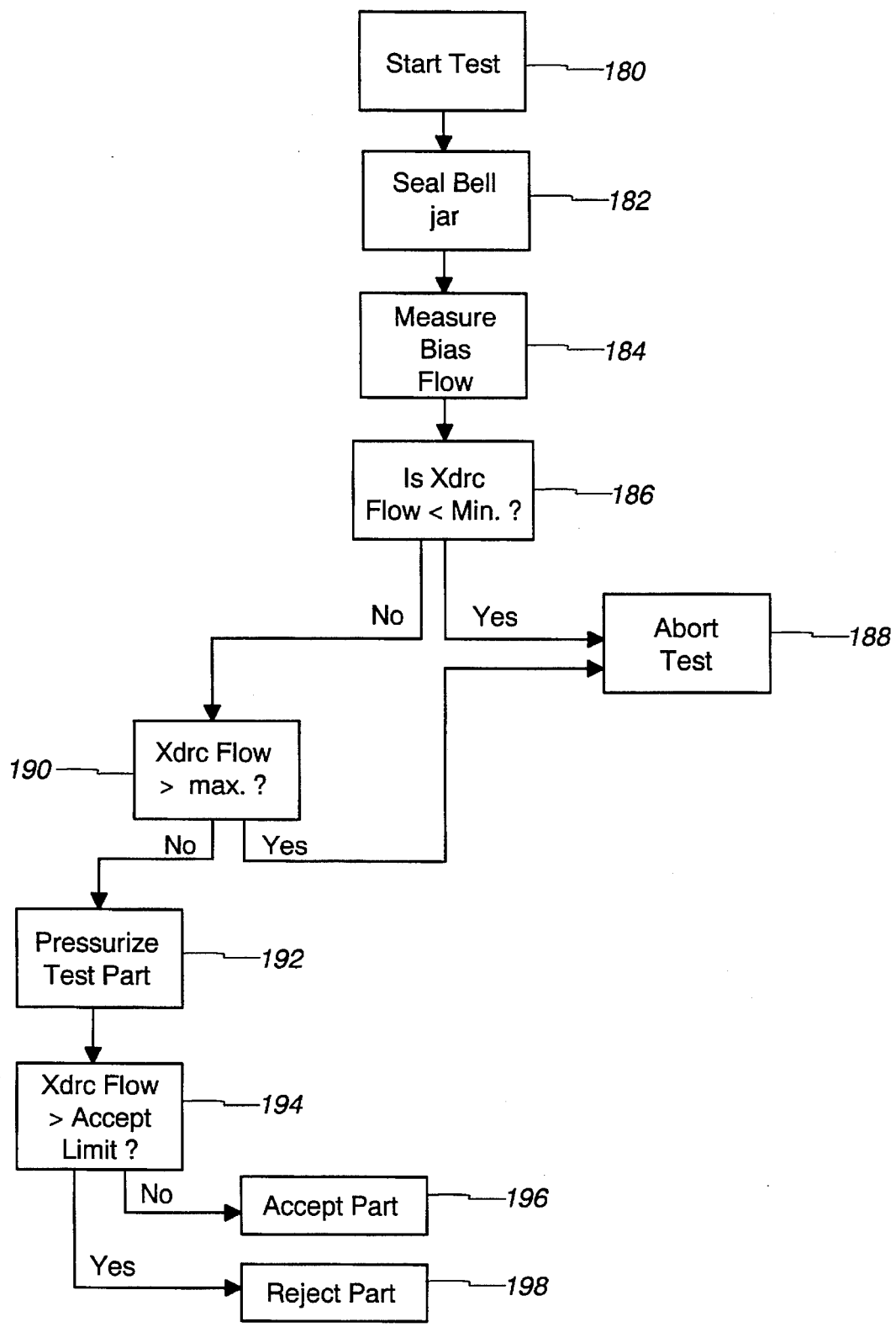
FIG. 3 is a flow diagram of the steps taken during a leakage test of the part under test by the leak detection system.

FIG. 3 illustrates a flow diagram of the testing sequence for testing the test part 12 in conjunction with the computer 14. The computer 14 receives information from the air box 28. A computer program analyzes the information as illustrated in the flow diagram. The keyboard 18 is only used to enter test parameters and menus. The video display terminal 16 provides visual verification of information input to the computer 14 through the keyboard 18 and also provides to the operator instructions for testing and the results of testing such as whether a fault exists or whether the part has passed or failed the test. Other features of the program provide a compilation of test results and other information necessary to properly analyze a number of parts under test as is understood by those skilled in the art.

To begin testing a part, the operator prompts the computer and the air box 28 by the start button 29. The test part is either connected to the air line 34 manually by the operator or can be connected automatically if used with automated systems which automatically connect parts to the air line 34 for automatic testing. In either event, the test is started at step 180. Once the test is started, the sealed test fixture 38 is sealed at step 182 and the test light 75 is lit to indicate testing has begun. The bias flow is continuously on any time air is supplied to the system. Bias flow does not begin through the mass flow transducer 120 until valve 128 is energized to disconnect the output 130 from the vent 132. The sealed test fixture 38 can be sealed either manually or automatically depending on the system used.

Once the sealed test fixture 38 has been sealed, the reference bias flow is measured in step 184. The reference bias flow is adjusted by the bias flow pressure regulator 92, its value determined according to the type of part being tested. At this time, the test valve 108 is actuated to connect the line 106 to the line 112 and valve 128 is actuated to disconnect the output 130 from the vent 132. The mass flow transducer 120 measures flow which indicates the presence of anomalies in the system, such as leaks in the seal to the sealed test fixture 38. The flow measured by the mass flow transducer 120 is equal to the flow exiting the flow orifice 104 minus any leak in the seal to the bell jar exhibited as flow through the line 40.

The computer 14 reads the value of flow provided by the mass flow transducer 120 over the conductor 46 and compares the measured value to a minimum value previously established for the type of part under test. At step 186, a decision is made to determine if the measured flow through the transducer (Xdcr) 120 is less than the previously established minimum. If the measured value is less than the minimum value, then the test is aborted at step 188 and the fault light 80 is turned on by the computer 14. If the flow is not less than the minimum, the measured transducer flow is compared to a maximum value previously established for the part being tested at step 190. If the flow is greater than the maximum value as determined at step 190, the test is aborted at step 188. Otherwise, the testing operation continues by pressurizing the test part 12 at step 192. If a leak is present in the test part, the flow measured by the transducer 120 changes from the previously measured value which is equal to the bias flow minus any leakage present in the sealed test fixture 38. If no leak is measured the flow will be the same.

The measured flow is compared with a predetermined value which is an acceptable leak limit for the part being tested. The acceptable leak limit is predetermined by taking a profile of a number of parts taking into account certain anomalies such as adiabatic transient expansion effects. If the measured flow is not greater than the acceptable limit at step 194, the part is accepted at step 196 and the accept light 76 is turned on. If the measured flow is, however, greater than the acceptable limit at step 194, the part is rejected as being flawed and the reject light 78 is turned on. The test is now complete.

Thus there has been described herein a leak detector system using a sealed test fixture and an injected reference bias flow to accurately measure the rate of leaks from a part under test. It will be understood that various changes in the details, arrangements and configurations of parts and systems which have been herein described and illustrated in order to explain the nature of the invention may be made by those skilled in the art within the principle and scope of the invention as expressed in the appended claims. For instance, for the testing of some parts, it is not necessary to inject a reference bias flow before pressurizing the part, but the reference flow can be injected at the same time as the test part is pressurized for test, especially when testing a large number of like parts having similar characteristics.

What is claimed is:

1. A leakage detection system for testing a test part for leakage, said leakage detection system comprising:

a first connection line in fluid communication with an interior of the test part;

a sealed test enclosure for enclosing the test part in a substantially pressure sealed environment;

a reservoir means for enclosing a volume of gas;

a second connecting line for providing a gas flow passage between the enclosed volume of the reservoir means and the sealed environment of the sealed test enclosure;

a reference bias flow generator for injecting a reference bias flow of gas into the second connecting line; and a leak sensor coupled to the second connecting line for sensing an algebraic sum of the reference bias flow of gas and a gas flow between the test enclosure and the reservoir means and for detecting a leak when the algebraic sum of the reference bias flow of gas and a gas flow between the test enclosure and the reservoir means exceeds a predetermined amount.

2. The leakage detection system for testing a test part for leakage of claim 1 further including measurement means for measuring the algebraic sum of the reference bias flow of gas and the gas flow between the test enclosure and the reservoir means sensed by said leak sensor.

3. The leakage detection system for testing a test part for leakage of claim 1 wherein said leak sensor includes a mass flow transducer.

4. The leakage detection system for testing a test part for leakage of claim 1 further including a pressure regulator connected to said first connection line for pressurizing the interior of the test part.

5. The leakage detection system for testing a test part for leakage of claim 4 wherein said reference bias flow generator is connected to said second connecting line through a restricting means for establishing a reference bias flow rate.

6. The leakage detection system for testing a test part for leakage of claim 5 wherein said reference bias flow generator includes an adjustment means for controlling the reference bias flow rate.

7. The leakage detection system for testing a test part for leakage of claim 6 further including a pressure transducer means for measuring the pressure generated by said pressure regulator.

8. The leakage detection system for testing a test part for leakage of claim 1 wherein said test part has outer dimensions and said sealed test enclosure is a conformable sealed test enclosure for conforming substantially to the outer dimensions of the test part.

9. The leakage detection system for testing a test part of claim 1 wherein the test part has an internal volume and the volume of said reservoir means approximates the internal volume of the test part.

10. A method of testing for leaks in a test part by measuring the rate of leakage of a gas from the test part, said method of testing for leaks comprising the steps of:
    enclosing the test part in a substantially pressure sealed enclosure;
    enclosing a volume of gas in a reservoir;
    connecting the substantially pressure sealed enclosure to the enclosed volume of the reservoir;
    injecting a reference bias flow of gas into the connection between the enclosed volume of the reservoir and the substantially pressure sealed enclosure; and
    first measuring the algebraic sum of the reference bias flow of gas and a flow of gas passing through the connection between the substantially pressure sealed environment and the enclosed volume of the reservoir and identifying a leak when the algebraic sum of the reference bias flow of gas and the flow of gas passing between the substantially pressure sealed environment and the enclosed volume exceeds a predetermined amount.

11. The method of testing for leaks in a test part of claim 10 further comprising the steps of:
    establishing an acceptable amount of flow of gas; and
    stopping the test when the flow of gas measured in the first measuring step is not the acceptable amount of flow established in the establishing step.

12. The method of testing for leaks in a test part of claim 10 further comprising the steps of:
    pressurizing an interior of the test part; and
    second measuring the flow of gas passing between the substantially pressure sealed enclosure and the enclosed volume of the reservoir.

13. A method of testing for leaks in a test part by measuring the rate of leakage of a gas from the test part, said method of testing for leaks comprising the steps of:
    connecting the test part to a supply of pressure;
    enclosing the test part in a sealable test enclosure having an input;
    enclosing a volume of gas in a reservoir;
    connecting the sealable test enclosure to an input of a leak sensor;
    connecting the enclosed volume to an output of the leak sensor;
    sealing the sealable test enclosure;
    injecting a reference bias flow of gas into the input of the leak sensor; and
    first measuring the algebraic sum of the reference bias flow of gas and a flow of gas between the sealable test enclosure and the enclosed volume and detecting a leak when the algebraic sum of the reference bias flow of gas and the flow of gas between the sealable test enclosure and the enclosed volume exceeds a predetermined amount.

14. The method of testing for leaks in a test part of claim 13 further comprising the steps of:
    comparing the flow of gas measured in the first measuring step to a predetermined minimum value; and
    stopping the test when the measured flow of gas is less than the predetermined minimum value.

15. The method of testing for leaks in a test part of claim 14 further comprising the steps of:
    comparing the flow of gas measured in the first measuring step to a predetermined maximum value when the measured flow of gas is not less than a predetermined minimum value; and
    stopping the test when the measured flow of gas is greater than the predetermined maximum value.

16. The method of testing for leaks in a test part of claim 15 further comprising the steps of:
    pressurizing the test part;
    second measuring the flow of gas between the sealable test enclosure and the enclosed volume;
    comparing the flow of gas measured in the second measuring step to a predetermined acceptable limit;
    rejecting the test part when the flow of gas measured in the second measuring step is greater than the predetermined acceptable limit; and
    accepting the test part when the flow of gas measured in the second measuring step is not greater than the predetermined acceptable limit.

17. A method of testing for leaks in a test part connected to a first connection line comprising:
    enclosing the test part in a sealable test enclosure which is connected by a second connection line to a reservoir enclosing a predetermined volume of gas;
    injecting a reference bias flow into the second connection line;
    first measuring a flow of gas in the second connection line to determine whether the sealable test enclosure is sealed;
    pressurizing the test part through said first connection line when said enclosure is determined by the first measuring step to be sealed; and
    second measuring the flow of gas in the second connection line after the test part is pressurized to identify leaks in the test part when the flow of gas in the second connection measured in the second measuring step exceeds a predetermined amount.

18. The method of claim 17 comprising:

resealing the sealable test enclosure before the pressurizing step when the first measuring step determines that the sealable test enclosure is not sealed.

19. The method of claim 17 comprising:

identifying from said first measuring step an amount of seal leakage of the sealable test enclosure before the second measuring step; and computing an amount of leakage of the test part from the flow of gas measured in the second measuring step and the amount of seal leakage identified in the identifying step.

* * * * *